Figures 1, 2:
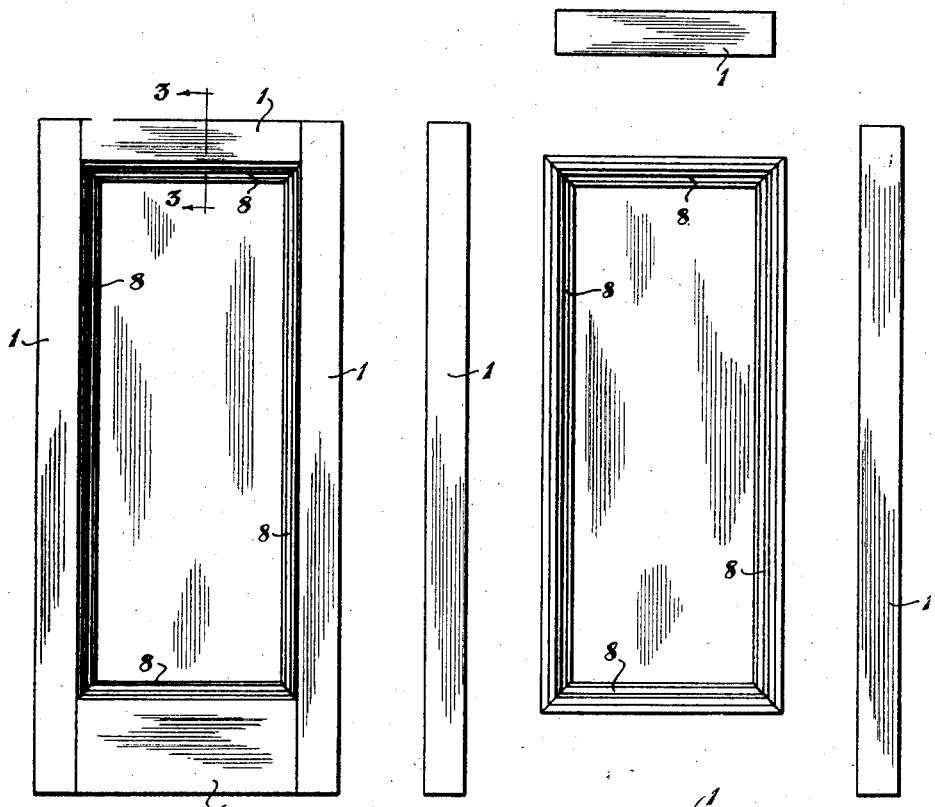

Sept. 13, 1927.         J. O. NYMAN         1,642,553
                        METAL DOOR
              Filed July 29, 1926        2 Sheets-Sheet 1

Inventor
John O. Nyman.
By Frease and Bond
Attorneys

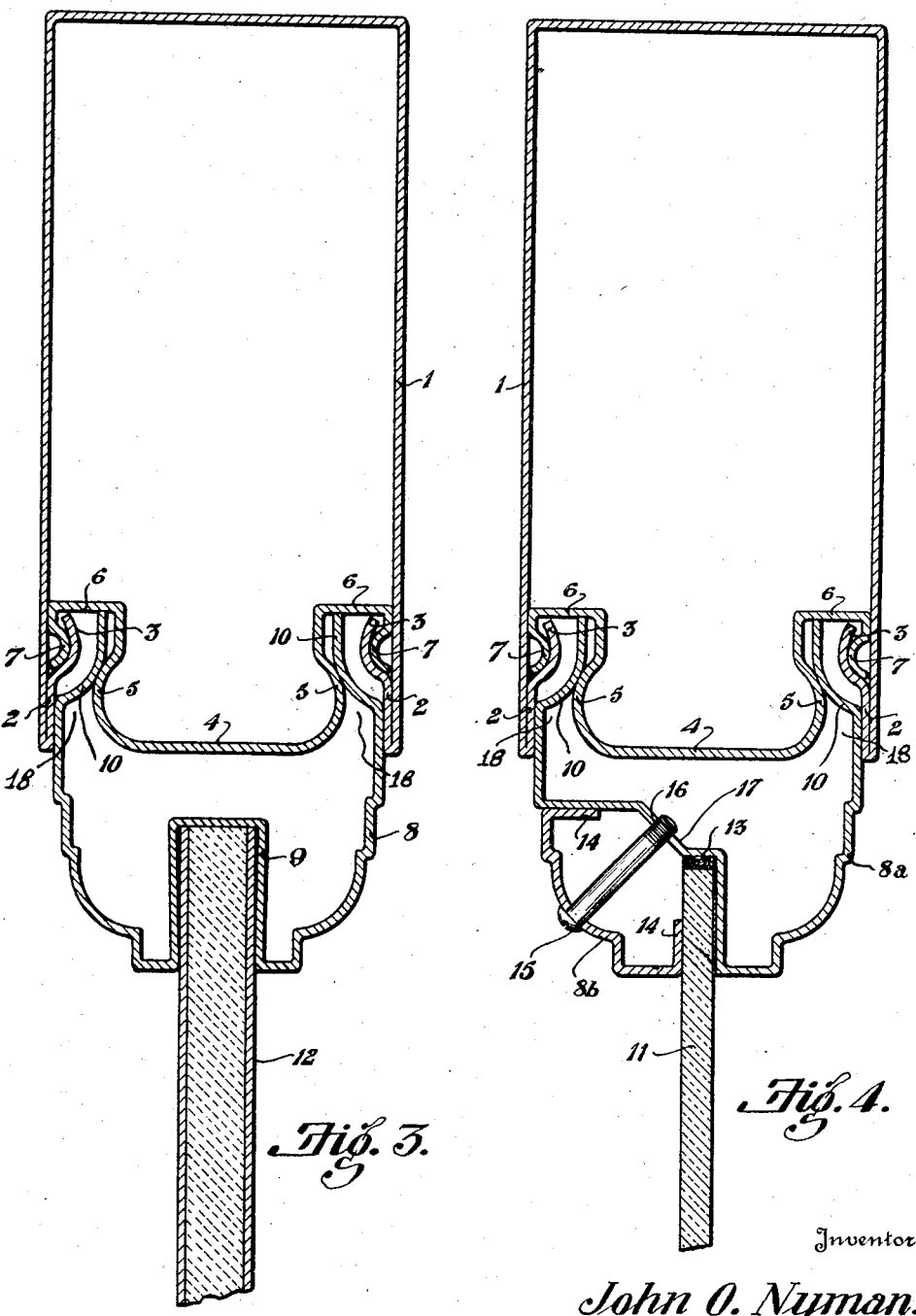

Patented Sept. 13, 1927.

1,642,553

UNITED STATES PATENT OFFICE.

JOHN OSCAR NYMAN, OF CANTON, OHIO.

METAL DOOR.

Application filed July 29, 1926. Serial No. 125,643.

The invention relates to sheet metal constructions including interconnecting stiles or rails and panels, and is particularly adaptable to metal doors; and this application is a continuation in part of my prior applications Ser. No. 47,035, filed July 30, 1925 and Ser. No. 82,197, filed January 19, 1926.

The object of the improvement is to provide a simple construction of door and the like especially adapted for quick assembling, and including a one-piece sheet metal stile of channel cross-section having an inturned spring flange portion at each free edge, for slidably receiving the ribs upon a channel reinforcing strip; a molding strip, provided with a channel for receiving the panel, having spring flanges adapted to be sprung into place and spring locked between the channel strip and the sides of the stile.

An embodiment of the invention is illustrated in the accompanying drawings, in which Figure 1 is an elevation of a sheet metal door constructed in accordance with the invention;

Fig. 2, a similar view showing the door in the process of assembling;

Fig. 3, an enlarged sectional view on the line 3—3, Fig. 1, and

Fig. 4, a similar view showing the construction of molding strip used in connection with a glass panel.

Similar numerals refer to similar parts throughout the drawings.

Each of the stiles 1 of the door may be of the same construction, except for the usual difference in width and length, which is customary in the manufacture of doors, and each stile comprises an integral sheet metal channel as best illustrated in Figs. 3 and 4. The free edge portions of the stile are folded back as shown at 2 and terminate in the curved spring flanges 3, spaced from the adjacent side walls of the stile.

The channel strip 4 has the convex sides 5 and is provided at each free edge with the inverted substantially U-shaped portion 6, terminating in an inwardly disposed rounded rib 7 for slidable engagement with the curved spring flanges 3 at the free edges of the stile.

The molding strip 8 is formed of a single sheet of metal provided with a central channel portion 9 and terminating in the inwardly curved spring flanges 10.

When the channel strip 4 is inserted in position in the stile it will be seen that a channel is thus formed between each side of the channel strip and the adjacent side of the stile.

In assembling the stiles upon the molding one spring flange 10 of the molding strip is inserted laterally into each of these channels of the stile and when the stile is pressed or pushed against the molding strip these spring flanges of the molding strip will assume the position, in these channels of the stile, shown in Figs. 3 and 4, spring locking the stile and molding strip together.

In the form shown in Fig. 4, the invention is illustrated as applied to a door provided with a glass panel 11. In this form of the invention the stiles and channel strip are of the same construction as above described, where a metal panel 12 is used.

The molding strip $8^a$ differs from that shown in Fig. 3, being constructed to permit replacing of the glass panel 11 in case of breakage. This molding strip has the seat 13 provided at its central portion to receive the edge portion of the glass panel, a detachable strip $8^b$ having the angular flanges 14 for engagement with the molding strip and glass panel, being arranged to be connected to the molding strip as by the screws 15 which are received in tapped apertures 16 formed in the inclined portion 17 of the molding strip.

When it is desired to remove the glass panel, in the event the same is broken or cracked, it is only necessary to remove the screws 15 when the strip $8^b$ may be detached from the molding and the glass panel removed. A new panel may be replaced in the door and the strip $8^b$ again mounted in place by means of the screws 15.

In assembling the door such as shown in either form of the invention, the molding strips are connected to the four edges of the panel forming a rectangular frame around the same as shown in Fig. 2.

The stiles are then pressed into engagement with the molding strips and connected at their adjoining edges by welding or the like, producing the completed door as shown in Fig. 1.

By thus providing the molding strips adapted to be pressed or snapped into engagement with the stiles, it will be seen that the assembling of a door or the like is more easily and quickly accomplished than is possible with the usual construction where the channel strips must be slidably engaged with the stiles.

It should be understood that although in the drawings the stile and channel strip are illustrated as two detachable parts, the advantages of the invention may be accomplished by forming the channel strip integral with the stile, it only being necessary to provide the channels 18 at the free edges of the stile, and the ribs 5 projecting into said channels whereby the curved flanges 10 of the molding strip, when entered into the channels 18, will be spring locked therein.

I claim:

1. A sheet metal structure including a channel stile having integral flanges at its free edge portions, a channel strip provided with convex sides and having ribbed portions at its free edges for engagement with said flanges, and a molding strip having spring flanges with means thereon adapted to be inserted laterally and spring locked between said convex sides of the channel strip and the free edge portions of the stile.

2. A sheet metal structure including a channel stile having integral spring flanges at its free edge portions, a channel strip provided with convex sides and having ribbed portions at its free edges for engagement with said flanges with means thereon, and a molding strip having spring flanges adapted to be inserted laterally and spring locked between said convex sides of the channel strip and the free edge portions of the stile.

3. A sheet metal structure including a channel stile having integral curved flanges at its free edge portions, a channel strip provided with convex sides and having ribbed portions at its free edges for engagement with said flanges with means thereon, and a molding strip having spring flanges adapted to be inserted laterally and spring locked between said convex sides of the channel strip and the free edge portions of the stile.

4. A sheet metal structure including a channel stile having integral curved spring flanges at its free edge portions, a channel strip provided with convex sides and having ribbed portions at its free edges for engagement with said flanges with means thereon, and a molding strip having spring flanges adapted to be inserted laterally and spring locked between said convex sides of the channel strip and the free edge portions of the stile.

5. A sheet metal structure including a channel stile member having channels, provided with longitudinal ribs, and a molding strip having spring flanges with means thereon whereby said flanges are adapted to be inserted laterally into said channels and interlocked with said ribs.

6. A sheet metal structure including a channel stile member having channels, provided with longitudinal ribs, and a molding strip having spring flanges terminating in curved edges adapted to be inserted laterally into said channels and interlocked with said ribs.

7. A sheet metal structure including a channel stile having integral flanges at its free edge portions, a channel strip having ribbed portions at its free edges for engagement with said flanges, a molding strip having spring flanges with offset portions, and means on said channel strip whereby said spring flanges are adapted to be inserted laterally and the offset portions thereof spring locked between said means on the channel strip and the free edge portions of the stile.

8. A sheet metal structure including a channel stile having integral spring flanges at its free edge portions, a channel strip having ribbed portions at its free edges for engagement with said flanges, a molding strip having spring flanges, means thereon, and means on said channel strip whereby the spring flanges of the molding strip are adapted to be inserted laterally and the means thereon spring locked between said means on the channel strip and the free edge portions of the stile.

9. A sheet metal structure including a channel stile having integral curved flanges at its free edge portions, a channel strip having ribbed portions at its free edges for engagement with said flanges, a molding strip having spring flanges, means thereon, and means on said channel strip whereby said spring flanges are adapted to be inserted laterally and the means thereon spring locked between said means on the channel strip and the free edge portions of the stile.

10. A sheet metal structure including a channel stile having integral curved spring flanges at its free edge portions, a channel strip having ribbed portions at its free edges for engagement with said flanges, a molding strip having spring flanges, means thereon, and means on said channel strip whereby the spring flanges of the molding strip are adapted to be inserted laterally and the means thereon spring locked between said means on the channel strip and the free edge portions of the stile.

11. A sheet metal structure including a stile member having channels at its edge portions, a molding strip having spring flanges at its free edges, means thereon, and means in said channels coacting with the means on the spring flanges whereby the spring flanges are adapted to be inserted laterally and spring locked into said channels.

12. A sheet metal structure including a stile member having channels at its edge portions, a molding strip having spring flanges with offset portions thereon and means in said channels whereby said spring flanges are adapted to be inserted laterally and said offset portions spring locked into said channels.

In testimony that I claim the above, I have hereunto subscribed my name.

JOHN OSCAR NYMAN.